Oct. 6, 1925. 1,556,053
R. P. WARREN ET AL
MACHINE FOR CUTTING AND SORTING PINEAPPLES AND THE LIKE
Filed Jan. 31, 1925  2 Sheets-Sheet 2
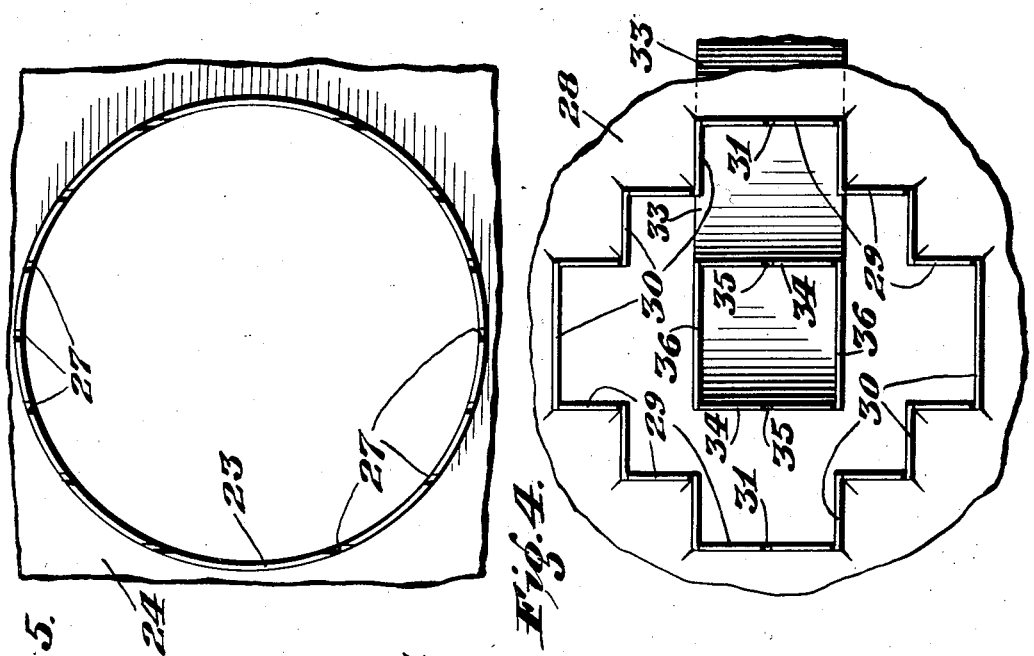
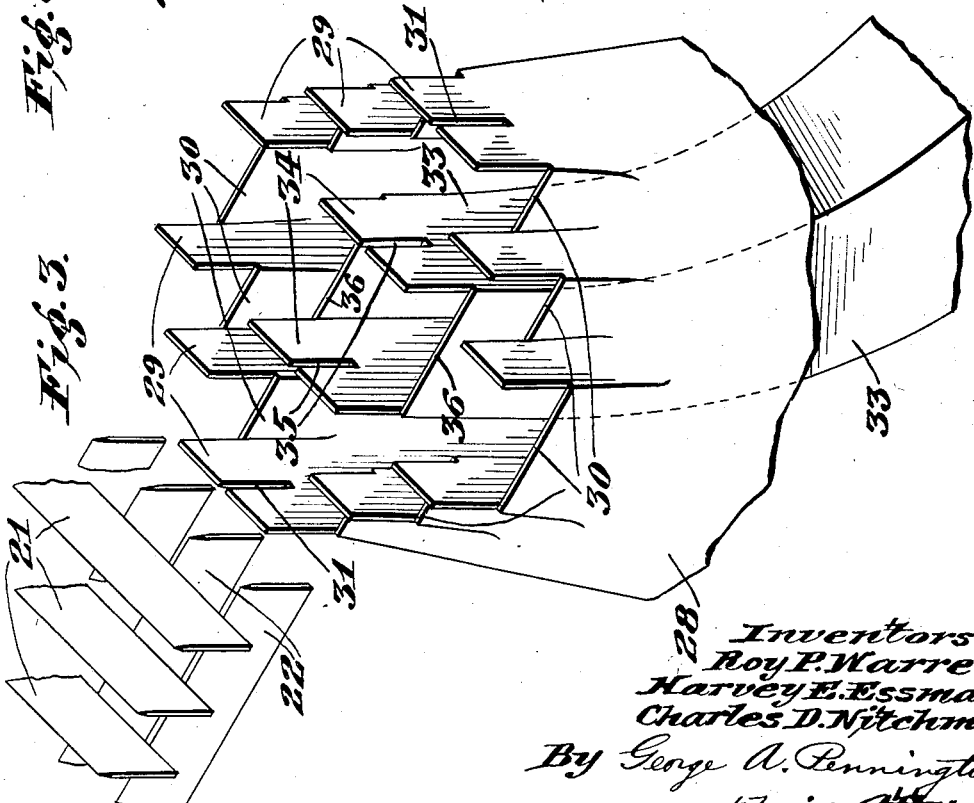
Inventors:
Roy P. Warren,
Harvey E. Essmann,
Charles D. Nitchman,
By George A. Pennington
their Atty.

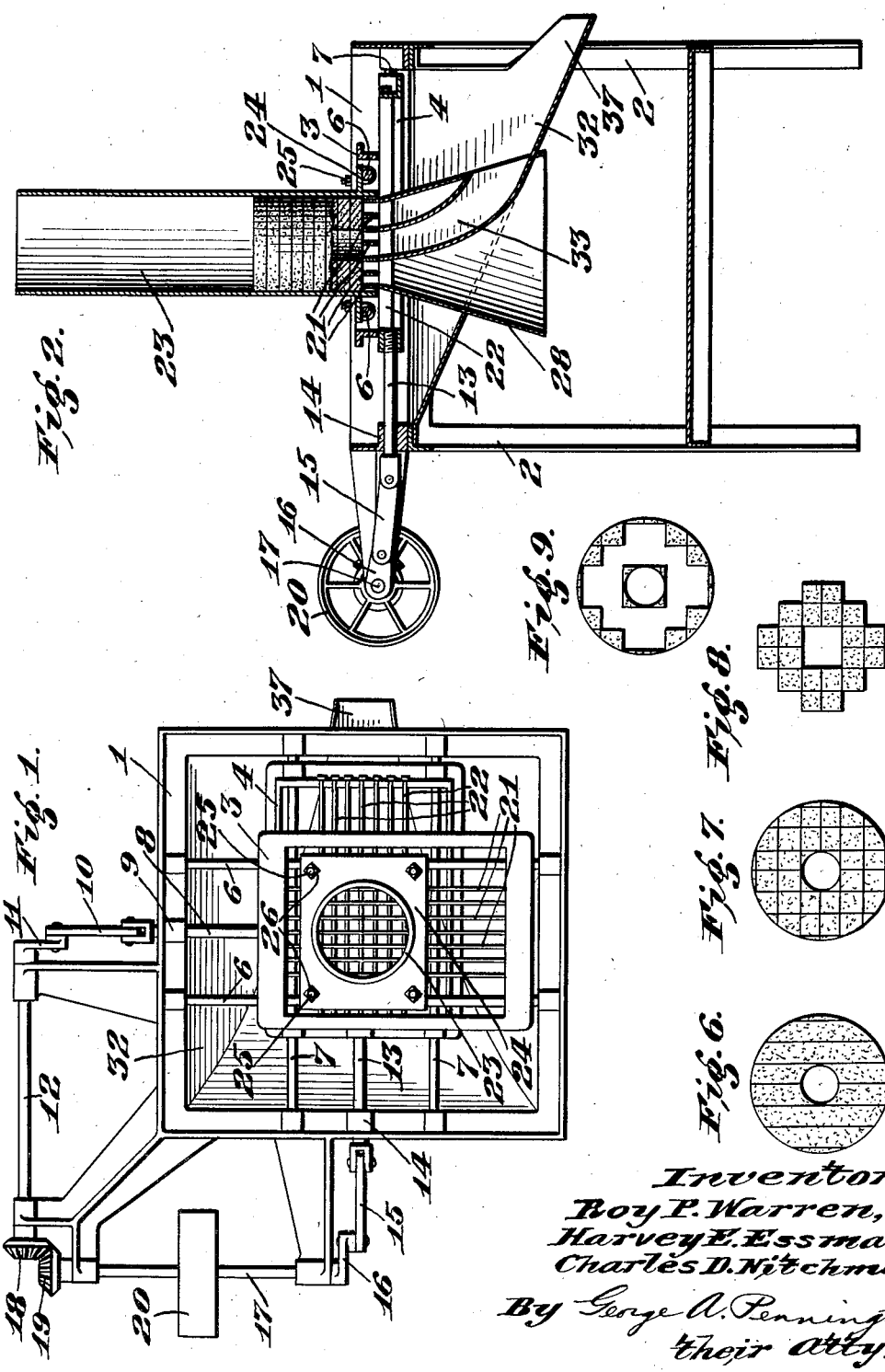

Patented Oct. 6, 1925.

1,556,053

UNITED STATES PATENT OFFICE.

ROY P. WARREN, HARVEY E. ESSMANN, AND CHARLES D. NITCHMAN, OF ST. LOUIS, MISSOURI.

MACHINE FOR CUTTING AND SORTING PINEAPPLES AND THE LIKE.

Application filed January 31, 1925. Serial No. 5,976.

*To all whom it may concern:*

Be it known that we, ROY P. WARREN, HARVEY E. ESSMANN, and CHARLES D. NITCHMAN, citizens of the United States, residing in the city of St. Louis, State of Missouri, have invented a new and useful Improvement in Machines for Cutting and Sorting Pineapples and the like, of which the following is a specification.

This invention relates to machines for cutting fruit, vegetables and other substances into cubic or prismatic pieces, and more particularly to a machine for cubing the ordinary sliced pineapple, such as that prepared for canning, or, in other words, the washer-like disks or circular slices of the fruit having a central core hole, the object being to produce regular and uniform cubes for garnishing cakes, pastry, confections, beverages and the like.

It is a common practice to cut such cubes by hand, and machines have been made to produce them, but, so far as we are aware, there has been no satisfactory machine or device produced for sorting the first grade or regular cubes from the scrap or irregular pieces, this being usually done by hand on a sorting table.

The present invention has for its principal object to produce a simple and efficient machine for automatically cutting the substance and effecting an automatic separation of the perfectly formed from the irregular pieces. Other objects and advantages to be attained will hereinafter more fully appear from the following description.

The invention consists in the novel parts and combinations and arrangements of parts hereinafter described and afterwards pointed out with particularity in the appended claims.

In the accompanying drawings illustrating a practical embodiment of the invention,—

Figure 1 is a top plan view of the machine;

Figure 2 is a vertical section taken on a line about the middle of the machine;

Figure 3 is a fragmentary, schematic view of the cutting knives associated with a fragment of the sorting device, to illustrate the correlation between them;

Figure 4 is a top end view of the sorting device;

Figure 5 is a bottom end view of the hopper tube;

Figure 6 is a face view of a representation of a disk of pineapple or the like, showing the cuts made by the upper set of knives;

Figure 7 is a similar view showing the cross cuts made by the lower set of knives as the disk passes from the upper set of knives;

Figure 8 is a view showing the arrangement of the perfectly formed cubes as cut from the major portion of the disk; and Figure 9 is a view showing the irregular shaped pieces cut from the region of the central core hole and the peripheral portion of the disk.

Referring now to the drawings, the machine comprises a suitable body frame 1 mounted on a supporting frame or stand 2. Mounted to reciprocate horizontally on the body frame, in crossed relation at right angles to each other, are two knife carriers 3, 4. These carriers are in the form of rectangular frames, slidably mounted on guide rods 6 and 7, respectively.

The frame of the carrier 3 has a connecting rod 8 attached thereto and working through a bearing 9 in the body frame. At its outer end the rod 8 is pivotally connected to a link 10, which latter is in turn connected pivotally to a crank 11 on a driving shaft 12. The carrier 4 has a similar connecting rod 13 working through a bearing 14 in the body frame and being connected by a link 15 to a crank 16 on a driving shaft 17.

The two shafts 12 and 17 are disposed at right angles to each other and they have miter gears 18, 19, at their meeting ends, whereby the one shaft may be driven by the other, one of said shafts having a pulley 20 thereon for the application of a driving belt (not shown).

The carrier 3 has a set of parallel knives 21 thereon in equally spaced relation to each other, the cutting edges of the knives being at the top. A similar set of knives 22 is provided on the carrier 4 and their upper cutting edges just clear the lower edges of the upper set of knives 21.

Supported on the guide rods 6 for the upper carrier 3, is a vertically-disposed, cylindrical hopper or tube 23. This hopper is provided near its lower end with a horizontal flange or plate-like collar 24 to rest on said rods 6, said flange or collar having apertures therein for the reception of hook-bolts 25 which engage under and about said rods and are secured by clamping nuts 26 which engage the upper face of the flange or collar.

The lower end portion of the hopper cylinder is provided with a series of slots 27 to receive the respective cutting knives 21 on the upper carrier 3, and the edge of the cylinder terminates, preferably, close to the lower edges of the knives. In this way the wall portions of the cylinder between the respective slots 27 afford abutments which hold the strips cut by the knives from moving endwise with the knives during the cutting operation and until the strips have passed onto the lower set of knives and are being cross-cut by the latter.

Below the lower set of knives 22 is a sorting device to be now described. This device is in the form substantially of a truncated cone 28, the upper portion of which has square, flat upstanding walls 29 in parallel and spaced relation to each other, the upper edges of these walls being under and close to the lower edges of the upper knives 21, except that there are no walls under the middle knife of the set.

The upper edges of the walls 29 and the transverse walls 30 at the bases thereof form a rectilinear or crenelated outline lying within the range of the circle of and concentric with the lower end of the hopper cylinder 23, and the square faces of the walls 29 and 30 merge gradually downward into the surface of the cone proper. The middle walls 29 are provided with vertical slots 31 extending downward to a horizontal line substantially in the plane of the edges of the transverse walls 30 so as to make clearance for the middle knife of the lower set 22. The other knives of the set 22 operate in the narrow spaces between the other walls 29, the lower edges of the several knives 22 being close to the ends of the slots 31 and edges of the walls 30. The cubes cut within the confines of the walls 29 and the knives 22 (see Figure 8) are thus held from moving with the reciprocating knives, and after being completely severed fall within the cone 28 and through the latter into a pan or other receptacle (not shown) which may be conveniently placed beneath the cone.

The cone is brought up from and supported by an inclined hopper-like pan or tray 32, which latter is supported at its marginal portions on the body frame 1, and the irregular pieces cut from the peripheral portions of the disks of pineapple or other substance after passing from the lower set of knives 22 (see Figure 9) fall outside of the cone 28 and onto the pan or tray 32.

In the center of the cone 28 is a tube 33 whose upper end portion is square and covers the range of the middle three knives of both sets of knives 21 and 22, into which tube the irregular pieces (four of them) cut from the region of the core opening of the disk of pineapple (see Figure 9) fall.

The upper end portion of the tube has two opposed walls 34 provided with slots 35 and corresponding to the walls 29 of the cone 28, and the transverse walls 36 corresponding to the walls 30 of the cone terminate in the same plane with the latter. The tube 33 is curved downward and to one side of the cone and opens through the wall of the latter onto the pan or tray 32. The pan or tray 32 may have a spout or chute 37 at the end of which may be placed a pan or receptacle (not shown) to receive the material therefrom.

In practice, of course, the respective knives 21 and 22 will be of very thin gauge metal; also the several walls 29, 30, 34 and 36, respectively of the cone 28 and tube 33 are of correspondingly thin gauge. These parts being shown, by necessity in the drawings, of exaggerated thickness for the purpose of illustration.

According to the diameter and thickness of the usual, standard size slice of pineapple, of the washer-like disk shape as produced commercially, it has been found that by using seven knives in each of the crossed sets and in equally spaced relation, that substantially perfect cubes with all equal sides will be cut. However, in any case the space between the respective knives should be approximately the same as the thickness of the slice from which the cubes are cut and the number of the knives will, of course, depend on the diameter of the slice.

In using the machine the slices of the pineapple or other substance are stacked in the hopper tube, the lowermost slice resting on the upper set of knives. The knives when reciprocated cut the slice resting thereon into strips as shown in Figure 6. The stripped slice coming upon the lower set of knives is cross-cut, thereby forming the cubes as shown in Figure 7, certain of the cubes being perfectly formed throughout the major portion of the slice as shown in Figure 8, while those in the peripheral region of the slice and about the central core opening are irregular. However, as above pointed out, the perfect cubes are automatically separated from the imperfect ones through the arrangement of the sorting device.

Obviously, when the slices or disks of the substance to be cubed have no central core opening, perfect cubes will be formed from the central portion thereof, in which cases, of course, the central sorting tube 33 may be eliminated, but, again, in cases where the central or core portion of the substance should be more or less fibrous and not so choice as the major portion, as in pineapple and the like, then those cubes from that region can be taken off through the central tube 33 and either gathered separately or mixed with the pieces from the peripheral portion of the slice, as desired. It is further obvious that if a substance is fed through the hopper 23 in pieces greater in thickness than the average slice for which the width between the respective knives 21 and 22 is primarily determined, the resultant cut pieces will, of course, be elongated cubes or prisms rather than true cubes with equal sides. Also, it is possible to cut a whole pineapple or the like into prismatic pieces or strips, and, by eliminating one set of the knives 21 or 22, the substance will be sliced parallel with the axis of the core, thereby, in either case, cross-cutting the fibers which radiate from the core and producing a more desirable product than if the cutting was transversely of the core. Obviously, in these latter mentioned cases, the pineapple is first peeled and then inserted longitudinally with respect to its core into the hopper 23.

The machine admits of considerable modification within the spirit of the invention and its scope as defined by the appended claims. Therefore, it is not limited to the specific construction and arrangement shown in the accompanying drawings.

What is claimed is:

1. In a machine for cutting pineapple and the like, means for cutting the substance into cubic pieces, and a correlated sorting device arranged to receive and separate cubes of certain predetermined formation from the others.

2. In a machine for cutting pineapple and the like, means for first cutting the substance into strips and then cross-cutting the same to produce cubic pieces, and a sorting device correlated to said cutting means for receiving and separating pieces of certain predetermined formation from the others.

3. In a machine for cutting pineapple and the like, a tubular hopper for receiving the substance, a series of cutters operating transversely of said hopper for severing the substance into cubic pieces, and a sorting device correlated to said cutters for receiving and separating certain pieces from the others.

4. In a machine for cutting circular slices of pineapple and the like into cubes, a tubular hopper for receiving a stack of the slices, a series of cutters associated with said hopper and adapted to cut the slices successively into parallel strips, a second series of cutters operating crosswise of said first mentioned series of cutters for severing said strips into cubes, and means cooperating with said cutters and the discharge end of said hopper for receiving and separating certain predetermined cubes from the others.

5. In a machine for cutting circular slices of pineapple and the like into cubes, an upstanding tubular hopper for receiving a stack of the slices, a series of parallel knives reciprocating transversely of said hopper, said knives being equidistant and the space between the respective knives being substantially the same as the slice thickness, a second series of like knives operating at right angles to said first mentioned set in close relation thereto, and a sorting device comprising an open-ended, annular member whose upper end portion is rectilinear in outline and lies concentric with and in the range of the circle of the discharge end of said hopper, and a contiguous receptacle surrounding said annular member.

6. In a machine for cutting circular slices of pineapple and the like into cubes, an upstanding tubular hopper for receiving a stack of the slices, a series of parallel knives reciprocating transversely of said hopper, said knives being equidistant and the space between the respective knives being substantially the same as the slice thickness, a second series of like knives operating at right angles to said first mentioned set in close relation thereto, and a sorting device comprising an open-ended, annular member, whose upper end portion is rectilinear in outline and lies concentric with and in the range of the circle of the discharge end of said hopper, a contiguous receptacle surrounding said annular member, and a central tube within said annular member, its upper end portion being square and corresponding to the width and breadth between the several knives covering the range of the core portion of a slice, said tube turning downward towards and through an opening in the wall of said annular member.

ROY P. WARREN.
HARVEY E. ESSMANN.
CHARLES D. NITCHMAN.